US009885389B2

(12) United States Patent
Bois et al.

(10) Patent No.: US 9,885,389 B2
(45) Date of Patent: Feb. 6, 2018

(54) COUPLING OF SHAFTS USING VARIABLE-PROFILE SPLINES

(71) Applicant: SNECMA, Paris (FR)

(72) Inventors: Stephane Bois, Solers (FR); Guillaume Patin, Lieusaint (FR)

(73) Assignee: SNECMA, Paris (FR)

( * ) Notice: Subject to any disclaimer, the term of this patent is extended or adjusted under 35 U.S.C. 154(b) by 440 days.

(21) Appl. No.: 14/394,212

(22) PCT Filed: Apr. 12, 2013

(86) PCT No.: PCT/FR2013/050795
§ 371 (c)(1),
(2) Date: Oct. 13, 2014

(87) PCT Pub. No.: WO2013/153339
PCT Pub. Date: Oct. 17, 2013

(65) Prior Publication Data
US 2015/0125269 A1    May 7, 2015

(30) Foreign Application Priority Data

Apr. 13, 2012 (FR) .................................. 12 53432

(51) Int. Cl.
*F16D 1/02* (2006.01)
*F01D 15/08* (2006.01)
(Continued)

(52) U.S. Cl.
CPC .............. *F16D 1/02* (2013.01); *F01D 5/026* (2013.01); *F01D 15/08* (2013.01); *F16D 1/101* (2013.01);
(Continued)

(58) Field of Classification Search
CPC ... F16D 1/02; F16D 1/10; F16D 1/101; F16D 2001/102; F16D 2001/103; F01D 5/026;
(Continued)

(56) References Cited

U.S. PATENT DOCUMENTS 1,241,118 A * 9/1917 Hoskins ................... F16D 3/18
464/157
2,070,140 A * 2/1937 Peterson ................. F16D 11/10
192/108
(Continued)

FOREIGN PATENT DOCUMENTS

DE        199 29 639       2/2001
DE    10 2007 004 212      9/2007
(Continued)

OTHER PUBLICATIONS

International Search Report dated May 31, 2013 in PCT/FR13/050795 Filed Apr. 12, 2013.
(Continued)

*Primary Examiner* — Nathaniel Wiehe
*Assistant Examiner* — Brian O Peters
(74) *Attorney, Agent, or Firm* — Oblon, McClelland, Maier & Neustadt, L.L.P.

(57) ABSTRACT

A device for coupling two shafts by a gear mechanism includes a coupling part ending one of the two shafts. The coupling part is fitted concentrically into a complementary coupling part ending the other shaft. Splines of the coupling part have a constant profile along a median zone of the coupling part and which, in a first zone in continuation of the median zone, has a smaller thickness, between flanks of a spline, than a maximum thickness of the same spline in the median zone. Splines of the coupling part continue, beyond the first zone, as far as a centering zone on the same side as the first zone. The splines and the spline bottoms have, in the
(Continued)

coupling zone between the centering zone and the first zone, a profile that continuously couples the splines and the spline bottoms to the surface of the centering zone.

12 Claims, 4 Drawing Sheets

(51) Int. Cl.
 *F16D 1/10* (2006.01)
 *F01D 5/02* (2006.01)
(52) U.S. Cl.
 CPC ... *F16D 2001/103* (2013.01); *Y10T 403/7026* (2015.01); *Y10T 403/7035* (2015.01)
(58) Field of Classification Search
 CPC ......... Y10T 403/7026; Y10T 403/7028; Y10T 403/7035
 See application file for complete search history.

(56) References Cited

U.S. PATENT DOCUMENTS

| | | | | |
|---|---|---|---|---|
| 3,393,533 A * | 7/1968 | Wilkinson | ............... | F01D 5/025 403/359.1 |
| 3,638,455 A | 2/1972 | Francois | | |
| 4,875,796 A * | 10/1989 | Storm | ................... | F16D 1/0858 403/298 |
| 5,503,494 A * | 4/1996 | Kamata | ................. | F16D 1/0858 403/359.6 |
| 7,374,493 B2 * | 5/2008 | Sakurai | ..................... | F16D 1/06 403/359.6 |
| 8,079,912 B2 * | 12/2011 | Matsubara | ................ | F16C 3/02 403/359.6 |
| 2005/0107169 A1 | 5/2005 | Sakurai et al. | | |
| 2007/0225082 A1 | 9/2007 | Valovick | | |
| 2013/0230352 A1 * | 9/2013 | Goulet | ................... | A01B 71/06 403/364 |

FOREIGN PATENT DOCUMENTS

| | | |
|---|---|---|
| EP | 1 533 534 | 5/2005 |
| FR | 2 918 726 | 1/2009 |
| WO | 2008 099689 | 8/2008 |

OTHER PUBLICATIONS

International Search Report and Written Opinion dated May 31, 2013 in the corresponding PCT/FR2013/050795 (with Translation of Category of Cited Documents).

French Search Report and Written Opinion dated Aug. 14, 2012 in the corresponding French Application No. 1253432 (with Translation of Category of Cited Documents).

* cited by examiner

COUPLING OF SHAFTS USING VARIABLE-PROFILE SPLINES

FIELD OF THE INVENTION

The invention relates to devices for coupling shafts, such as devices for coupling between a turbine shaft and a compressor shaft.

It is particularly applicable to devices for coupling turbine and compressor shafts of turbine engines propelling aeronautical vehicles.

STATE OF THE RELATED ART

Low-pressure turbine and low-pressure compressor shafts are generally coupled by a gear coupling device.

In such a device, an example whereof is shown in FIGS. 1a and 1b, a part ending the compressor shaft 10 and a part ending the turbine shaft 20 are mutually engaged coaxially, the two shafts 10, 20 extending along the same axis of rotation X-X.

Each of the parts comprises a plurality of splines 12, 22, the splines of one engaging with the splines of the other. Each part further has so-called centring zones, respectively downstream 14a, 24a and upstream 14b, 24b from the splines 12, 22 wherein the complementary surfaces enable axial centring of the two shafts in respect to each other.

The splines generally have a constant profile along the entire length thereof.

It is desirable, in the field of turbine engines, to reduce the diameter of rotary shafts and increase the torques transmitted by the coupling devices.

The result is an increase of the ratio of the torque to be transmitted against the geometrical radius of the shaft splines and particularly significant forces on the downstream part of the splines, which is subject to the greatest stress, the transmission of motion being, in the case of a turbine-compressor coupling, performed from the downstream turbine towards the upstream compressor in relation to the air flow in the turbine engine.

In the document FR 2 918 726, a coupling device wherein the splines of one of the shafts have a variable profile was proposed.

More specifically, the splines 22 of the coupling part of the low-pressure turbine shaft 20, represented schematically in FIG. 2, have at the downstream end thereof a zone along which the thickness $e_2$ of the splines is smaller in relation to the thickness $e_1$ of the rest of the spline. The thickness of a spline is measured between the flanks 23 of the spline, at the top 26 thereof since the flanks 23 of the splines, have a profile, in a cross-sectional view, in the form of an involute to a circle, and the thickness of a spline thus varies according to the level at which it is measured.

The splines 12 of the low-pressure compressor shaft 10 in turn have a constant thickness between the flanks thereof, along the entire length thereof.

In this way, when cold, only the zones of the splines wherein the thickness between the flanks is maximum touch the splines of the other shaft. In operation, heating and the torque transmitted deform the splines, closing the initial gap.

This deformation helps improve contact pressure distribution between the splines during operation, and thus reduce stress.

However, this solution generates two critical zones in operation. The first is situated at the downstream end of the splines of the low-pressure turbine shaft, on the free edges of the flanks of the splines and at the junction between the flanks of the splines and the bottoms of the splines. This zone is a zone wherein tensile stress accumulates, having a lesser service life compared to the rest of the shaft. Consequently, the existence of this zone involves a reduction in the service life of the shaft.

Furthermore, in order to lighten the shaft, a cavity 25, i.e. a zone of the shaft wherein the thickness is reduced in a transverse plane, has been provided between the downstream end of the spline and the downstream centring zone 24a (see FIG. 1b), in relation to the thickness of the shaft at the downstream centring zone.

This cavity 25 forms a second critical zone where inertia is reduced, rendering said zone weaker and decreasing the strength thereof in the event of extreme loading, for example in the event of the expulsion of the fan blade in the event of rupture thereof (known as "Fan Blade Off").

DESCRIPTION OF THE INVENTION

The aim of the present invention is that of remedying the problems described above, by developing spline profiles suitable for satisfactory torque transmission and ensuring strength in the event of extreme loading.

For this purpose, the invention relates to a device for coupling shafts by means of a gear mechanism, comprising a coupling part ending one of the two shafts and intended to be fitted concentrically into a complementary coupling part ending the other shaft, said coupling part comprising two centring zones between which a plurality of splines extend, wherein the splines of said coupling part have a profile:
  which is constant along a median zone of the coupling part and
  which, in a first zone running in the continuation of said median zone, has a smaller thickness, between the flanks of a spline, by comparison with that of the same spline in the median zone,
and wherein the splines of said coupling part continue, beyond the first zone wherein they have a smaller thickness, as far as the centring zone which is on the same side as said first zone in relation to the median zone, said splines, and the spline bottoms, having, in the coupling zone between said centring zone and said first zone where they have a smaller thickness, a profile that continuously couples said splines and the spline bottoms to the surface of said centring zone.

Advantageously, but optionally, the invention may further comprise at least one of the following features:
  the splines have, in the coupling zone, a profile that increases in thickness from the zone where they have a smaller thickness towards the centring zone.
  in the coupling zone, the spline bottom depth decreases progressively as far as the surface of the centring zone.
  the bottom of the splines has, in the coupling zone, a curved profile.
  the splines of said coupling part also continue, on the side opposite the first zone, with a second zone wherein they have a profile of smaller thickness.
  the length of the median zone is between 0 and 80% of the total length of the spline.
  the intermediate zone runs along a length between 0 and 25% of the total length of the spline and the thickness of the spline along this zone decreases by 0 to 25% of the maximum thickness of the spline.
  the coupling zone runs along a length between 10 and 40% of the total length of the spline.
  the end zone of the spline runs along a length between 0 and 25% of the total length of the spline, and the thickness of the spline decreases by 0 to 15% of the maximum thickness of the spline.

the splines of the coupling part of the other spline have a constant profile.

The invention also relates to a rotary shaft comprising a part for coupling with another shaft, intended to be fitted concentrically into a complementary coupling part ending the other shaft, said coupling part comprising two centring zones between which a plurality of splines extend, wherein the splines of said coupling part have a profile:

which is constant along a median zone of the coupling part and which, in a first zone running in the continuation of said median zone, has a smaller thickness, between the flanks of a spline, by comparison with that of the same spline in the median zone, and wherein the splines of said coupling part continue, beyond the first zone wherein they have a smaller thickness, as far as the centring zone which is on the same side as said first zone in relation to the median zone, said splines, and the spline bottoms, having, in the coupling zone between said centring zone and said first zone where they have a smaller thickness, a profile that continuously couples said splines and the spline bottoms to the surface of said centring zone.

The invention further relates to a turbine engine comprising a compressor wherein the shaft is rotated by a turbine shaft, wherein the compressor shaft and the turbine shaft are coupled by a device according to the invention, the coupling part having a first zone of smaller thickness and a coupling zone being that of the turbine shaft, said first zone and the coupling zone being situated downstream from the median zone in relation to the direction of the air flow in the turbine engine.

DESCRIPTION OF THE FIGURES

Further features, aims and advantages of the invention will emerge from the description hereinafter, which is merely illustrative and not limiting, and which should be read with reference to the appended figures wherein.

DETAILED DESCRIPTION OF AT LEAST ONE EMBODIMENT

Figure 1A:
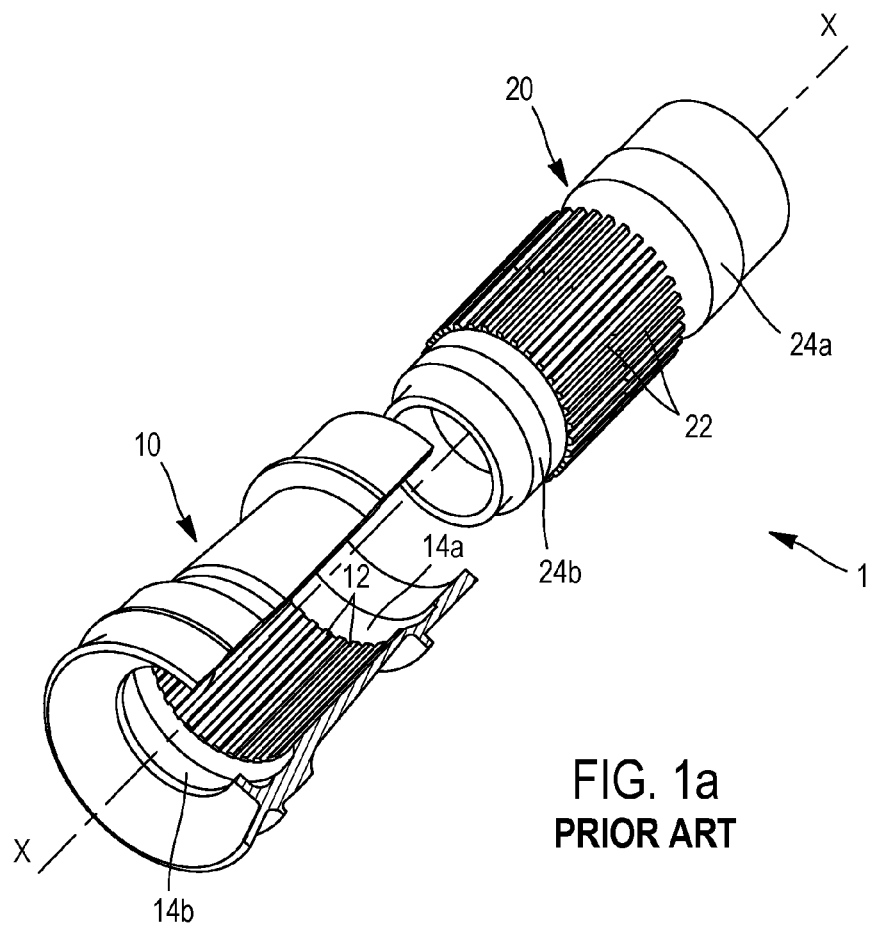
FIGS. 1a and 1b, described above, are schematic representations of a device for coupling shafts according to the prior art, in an exploded perspective and longitudinal section view respectively.
Figure 1B:
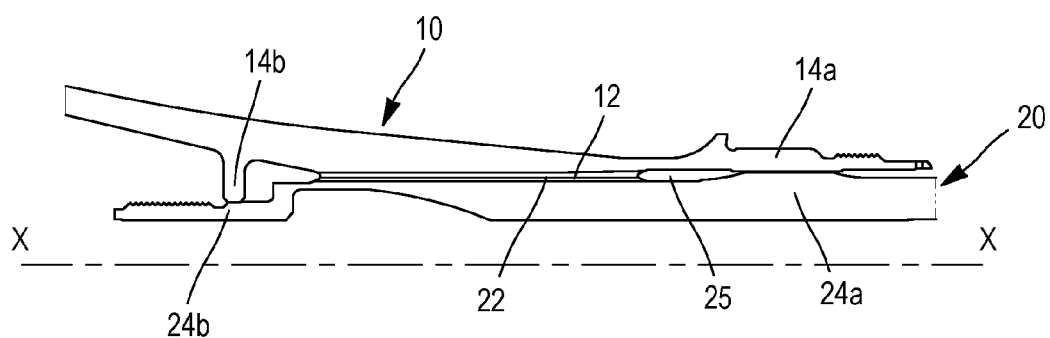
Figure 2:
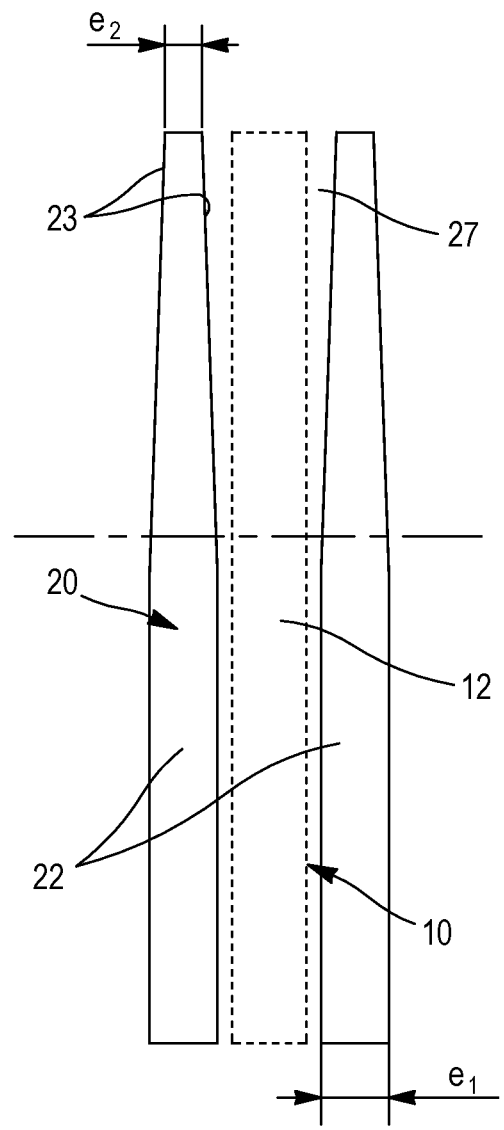
FIG. 2, described above, represents the splines of a low-pressure turbine shaft according to the prior art.
Figure 3:
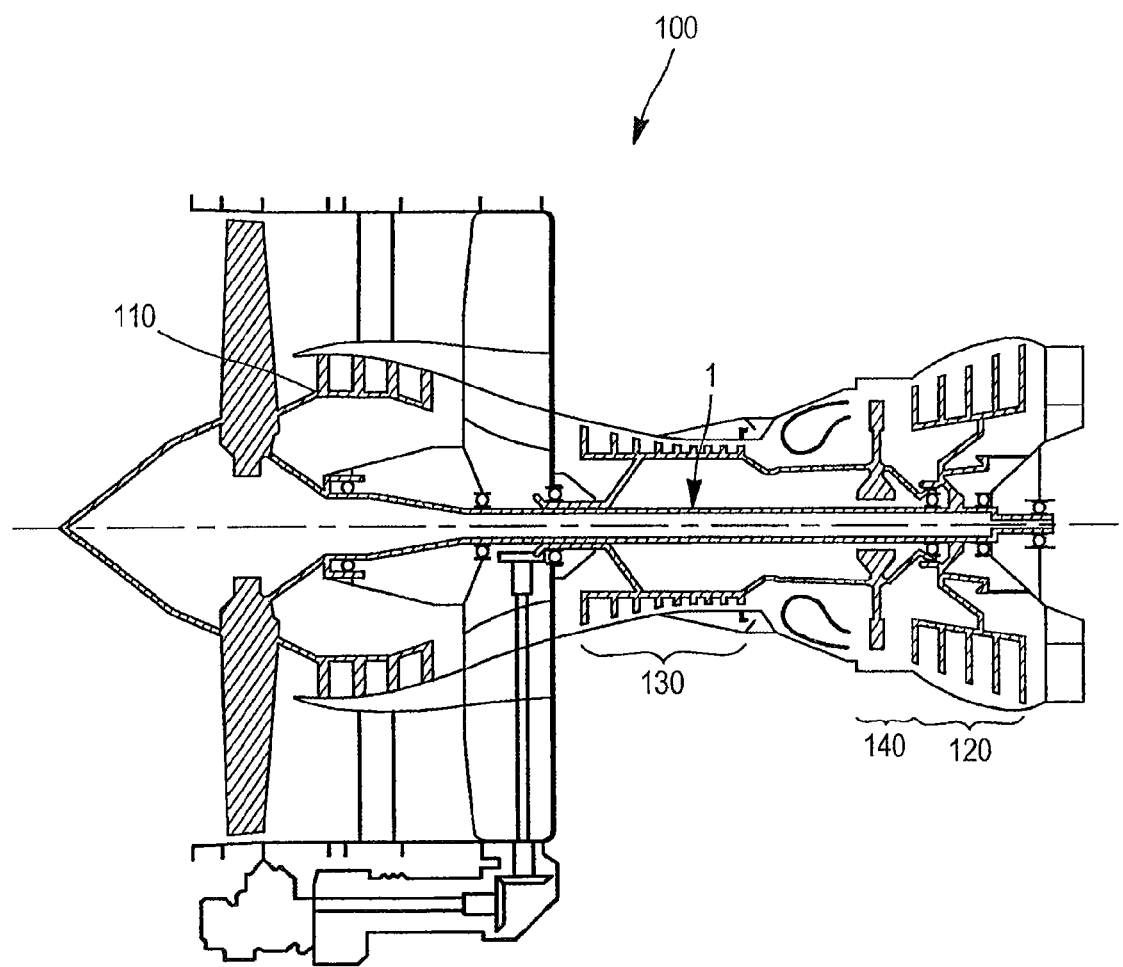
FIG. 3 represents schematically, in a longitudinal section, a turbine engine wherein a coupling device is fitted.

FIG. 3 represents a turbine engine 100 comprising a coupling device 1 according to the invention. The turbine engine 100 conventionally comprises upstream, in relation to the air flow in the turbine engine, a low-pressure compressor 110, and a high-pressure compressor 130, and downstream, a low-pressure turbine 120 and a high-pressure turbine 140.

The exhaust gases at the outlet of the high-pressure compressor 130 rotate the turbines 120, 140. The coupling device 1 enables the low-pressure turbine 120 to rotate the compressor 110, the torque being transmitted by means of a gear mechanism.

Figure 4:
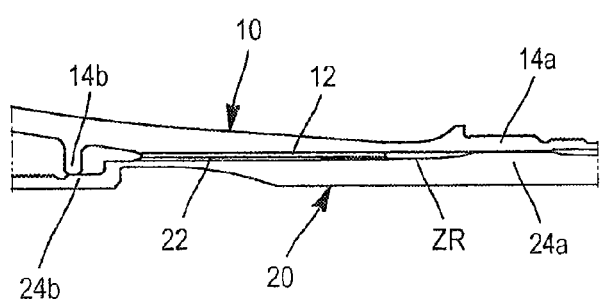
FIG. 4 represents schematically, in a longitudinal section, a device for coupling shafts according to the invention.

FIG. 4 represents a device 1 for coupling two shafts 10, 20, for example respectively of a low-pressure compressor 110 shaft 10, rotated by a low-pressure turbine 120 shaft 20 of a turbine engine 100.

The shafts 10, 20 each have a coupling part intended to be fitted concentrically into a complementary coupling part ending the other shaft. The shafts, including the coupling parts thereof, are arranged concentrically about an axis of rotation X-X.

The first shaft, in this instance the compressor shaft 10, has on the inner surface thereof a plurality of splines 12. The second shaft, in this instance the turbine shaft 20, has on the outer surface thereof a plurality of splines 22, suitable for engaging with the splines 12 of the first shaft 10.

On each shaft 10, 20, the splines 12, 22 extend between two centring zones, one downstream centring zone 14a, 24a, and one upstream centring zone 14b, 24b.

The upstream and downstream centring zones of the shafts are complementary, and make it possible to position the compressor shaft 10 correctly in relation to the turbine shaft 20.

For example, the upstream centring zones take the form of a circumferential protuberance and a corresponding circumferential groove.

The downstream centring zones of each shaft each have a cylindrical surface having a parallel axis with the axis of rotation X-X, which is elevated in relation to the rest of the shaft, particularly in relation to the bottom of the splines.

Figure 5B:
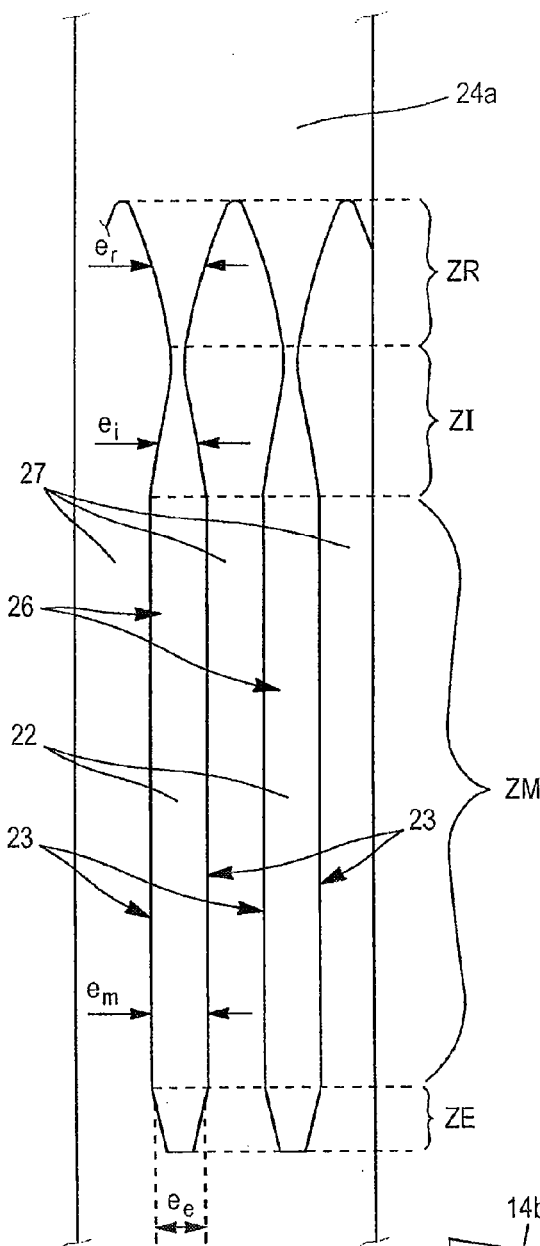
FIGS. 5a and 5b represent the splines of a shaft of a coupling device, in a perspective and top view respectively.
Figure 5A:
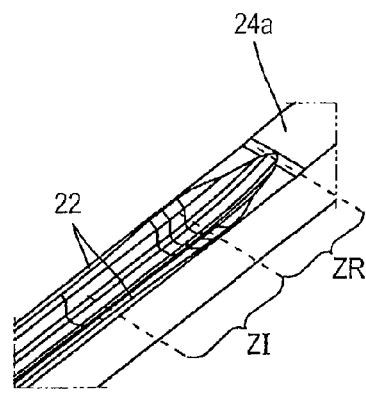

With reference to FIGS. 5a and 5b, splines of a shaft of the coupling device 1 are represented, preferably of the low-pressure turbine shaft 20.

Each spline 22 has two side flanks 23 and one top 26 connecting the flanks. Between two successive splines of the same shaft, a spline bottom 27 is occupied by a spline of the other shaft to enable gearing.

Preferably, the splines 12 of the first shaft have a thickness e between the flanks that is substantially constant along the entire length of the spline. As above, the thickness of a spline 12, 22 is measured at the top 16, 26 of the spline.

Moreover, each spline 22 of the second shaft 20 has a variable profile.

With reference to FIG. 5b, each spline has:

A median zone ZM, along which the spline has a constant thickness $e_m$ between the flanks thereof.

A first zone, or intermediate zone ZI, running in the continuation of the median zone ZM, and situated downstream therefrom in the case of a turbine engine, along which the thickness $e_i$ of the spline is smaller in relation to the thickness $e_m$ of the spline in the median zone. Preferably, this thickness $e_i$ decreases from the median zone ZM towards the downstream centring zone.

A so-called coupling zone ZR, running in the continuation of the intermediate zone ZI, on the same side as the intermediate zone ZI in relation to the median zone (in this instance downstream from the intermediate zone ZI in the case of a turbine engine), and forming a downstream end of the spline 22.

The coupling zone ZR connects the intermediate zone ZI to the downstream centring zone 24a of the shaft 20. For this purpose, the spline has, on this zone, a thickness $e_r$ between the flanks 23 thereof that increases from the intermediate zone ZI to the centring zone 24a, until the tops 26 of two successive splines of the shaft and the surface of the centring zone 24a join and form a continuous surface.

As such, the splines have, at the coupling zone, a profile continuously coupling said splines and the bottom of the splines 27 to the surface of said centring zone 24a.

Thus, the downstream ends of the splines 22 are merged together with the downstream centring zone 24a. In this way, the flanks 23 of the splines 22 have no free edges downstream where stress would be accumulated. The splines proposed thus have an increased service life in relation to the splines of coupling devices according to the prior art.

Moreover, the cavities 25 adjacent to the downstream ends of the splines according to the prior art are replaced by coupling zones ZR extending from the splines 22 as far as the centring zone 24a. There is thus no zone of lower inertia on the turbine shaft 20, which is thus reinforced, and the service life is enhanced.

Furthermore, as seen more particularly in FIG. 5a, the spline bottom 27 has, at the coupling zone ZR a decreasing thickness, from the maximum depth at the intermediate zone to a zero depth at the centring zone 24a.

The spline bottom 27 preferably has a curved profile, in a longitudinal sectional view, advantageously wherein the radius of curvature is continuous.

In this way, the surface formed by the spline bottom 27 and by the adjacent flanks has no discontinuity liable to induce stress accumulation.

Again with reference to FIG. 5b, the splines 22 may also have an upstream end zone ZE, adjacent to the median zone ZM and extending from same in the upstream direction. In this zone, each spline has a smaller thickness $e_e$ in relation to the thickness $e_m$ in the median zone.

The relative proportions of the various zones of the splines 22 are as follows:

The upstream end zone ZE has a length between 0 and 25% of the total length of the spline. The thickness $e_e$ of the spline at the upstream end thereof—and thus at the end of the zone—is reduced by 0 to 15% of the maximum thickness of the spline, this maximum thickness being the thickness $e_m$ at the median zone ZM.

The median zone ZM has a length between 0 and 80% of the total length of the spline. The thickness $e_m$ of the spline is constant, and equal to the maximum value thereof, which is defined in ANSI standard B92-1-1996 and is dependent on the turbine engine.

The intermediate zone ZI has a length between 0 and 80% of the total length of the spline. Along this zone, the thickness $e_i$ of the spline decreases by 0 to 25% in relation to the maximum thickness thereof. Preferably, the thickness $e_i$ of the spline is minimal at the downstream end of this zone, at the junction with the coupling zone ZR.

Finally, the coupling zone ZR has a length between 10 and 40% of the total length of the spline. The thickness $e_r$ of the spline increases until the flanks of two consecutive splines are joined.

According to one particular embodiment of the coupling device, the median zone may have a length of 60 mm, the intermediate zone a length of 25 mm, and the coupling zone a length of 30 mm. In this embodiment, the splines 22 have no upstream end zone ZE, i.e. the upstream ends of the splines correspond to the upstream ends of the median zones ZM.

A device for coupling shafts wherein the geometry is suitable for transmitting a greater torque and provides an enhanced service life in relation to the prior art is thus proposed.

This device is suitable, without being limited thereto, for installation in turbine engines.

The invention claimed is:

1. A device for coupling first and second shafts by a gear mechanism, comprising:
   a coupling part on an end of the first shaft, the coupling part to be fitted concentrically into a complementary coupling part on an end of the second shaft, said coupling part comprising first and second centering zones between which a plurality of splines extend,
   wherein each of the splines of said coupling part have a profile:
      which is constant along a median zone of the coupling part, and
      which, in a first zone running on from said median zone, has a smaller thickness, between opposite flanks of a spline, by comparison with a thickness of the same spline in the median zone,
   wherein the splines of said coupling part continue, beyond the first zone wherein the splines have a smaller thickness, as far as the first centering zone which is on the same side as said first zone in relation to the median zone,
   wherein the profile of each of said splines in a coupling zone between said first centering zone and said first zone has a thickness between the opposite flanks of the spline that increases from a first end of the coupling zone adjacent to the first zone to a second end of the coupling zone which is an end of the spline such that tops of two successive splines and a surface of said first centering zone form a continuous surface, and the splines, spline bottoms, and the surface of said first centering zone are continuously coupled, and
   wherein the profile of each of the splines in the first end of the coupling zone has a smallest thickness of the splines, and the profile of each of the splines in the second end of the coupling zone has a maximum thickness.

2. The device according to claim 1, wherein, in the coupling zone, a depth of the spline bottoms decreases progressively as far as the surface of the first centering zone.

3. The device according to claim 2, wherein the spline bottoms have, in the coupling zone, a curved profile.

4. The device according to claim 1, wherein the splines of said coupling part also extend in a second zone running on from the median zone, on a side opposite the first zone, and the profile of each of the splines in the second zone is of smaller thickness than the profile of each of the splines in the median zone.

5. The device according to claim 4, wherein the second zone, where the splines have a smaller thickness, runs along a length less than or equal to 25% of a total length of the splines, and the thickness of the splines decreases by less than or equal to 15% of the thickness of the splines in the median zone.

6. The device according to claim 1, wherein a length of the median zone is less than or equal to 80% of a total length of the splines.

7. The device according to claim 1, wherein the first zone runs along a length less than or equal to 25% of a total length of the splines and the thickness of the splines along the first zone decreases by less than or equal to 25% of the thickness of the splines in the median zone.

8. The device according to claim 1, wherein a length of the coupling zone is between 10 and 40% of a total length of the splines.

9. The device according to claim 1, wherein splines of a coupling part on an end of the second shaft have a constant profile.

10. A rotary shaft, comprising:
a coupling part for coupling with another shaft, to be fitted concentrically into a complementary coupling part on an end of the another shaft, said coupling part comprising first and second centering zones between which a plurality of splines extend,
wherein each of the splines of said coupling part have a profile:
which is constant along a median zone of the coupling part, and
which, in a first zone running on from said median zone, has a smaller thickness, between flanks of a spline, by comparison with that of the same spline in the median zone,
wherein the splines of said coupling part continue, beyond the first zone wherein the splines have a smaller thickness, as far as the first centering zone which is on the same side as said first zone in relation to the median zone,
wherein the profile of each of said splines in a coupling zone between said first centering zone and said first zone has a thickness between the opposite flanks of the spline that increases from a first end of the coupling zone adjacent to the first zone to a second end of the coupling zone which is an end of the spline such that tops of two successive splines and a surface of said first centering zone form a continuous surface, and the splines, spline bottoms, and the surface of said first centering zone are continuously coupled, and
wherein the profile of each of the splines in the first end of the coupling zone has a smallest thickness of the splines, and the profile of each of the splines in the second end of the coupling zone has a maximum thickness.

11. A turbine engine, comprising:
a turbine having a turbine shaft;
a compressor having a compressor shaft that is rotated by the turbine shaft; and
a device for coupling the compressor shaft and the turbine shaft by a gear mechanism, comprising:
a coupling part on an end of one of the turbine shaft and the compressor shaft, the coupling part to be fitted concentrically into a complementary coupling part on an end of the other of the turbine shaft and the compressor shaft, said coupling part comprising first and second centering zones between which a plurality of splines extend,
wherein each of the splines of said coupling part have a profile:
which is constant along a median zone of the coupling part, and
which, in a first zone running on from said median zone, has a smaller thickness, between opposite flanks of a spline, by comparison with a thickness of the same spline in the median zone,
wherein the splines of said coupling part continue, beyond the first zone wherein the splines have a smaller thickness, as far as the first centering zone which is on the same side as said first zone in relation to the median zone,
wherein the profile of each of said splines in a coupling zone between said first centering zone and said first zone has a thickness between the opposite flanks of the spline that increases from a first end of the coupling zone adjacent to the first zone to a second end of the coupling zone which is an end of the spline such that tops of two successive splines and a surface of said first centering zone form a continuous surface, and the splines, spline bottoms, and the surface of said first centering zone are continuously coupled, and
wherein the profile of each of the splines in the first end of the coupling zone has a smallest thickness of the splines, and the profile of each of the splines in the second end of the coupling zone has a maximum thickness.

12. The turbine engine according to claim 11, wherein the coupling part is on the end of the turbine shaft, said first zone and the coupling zone being situated downstream from the median zone in relation to a direction of an air flow in the turbine engine.

* * * * *